United States Patent [19]

Boers

[11] Patent Number: 4,708,297
[45] Date of Patent: Nov. 24, 1987

[54] ARMATURE WINDING MACHINE WITH REMOVABLE COLLET AND SHROUDS

[75] Inventor: Arie Boers, Plymouth, Minn.

[73] Assignee: Micafil, Inc., Minneapolis, Minn.

[21] Appl. No.: 782,431

[22] Filed: Oct. 1, 1985

[51] Int. Cl.$^4$ .............................................. H02K 15/09
[52] U.S. Cl. .................................. 242/7.05 B; 269/50;
403/328; 403/377
[58] Field of Search ................... 242/7.05 B, 7.05 R,
242/7.05 A, 1.1 R, 1.1 B; 403/328, 377–379;
269/51, 52, 58, 75

[56] References Cited

U.S. PATENT DOCUMENTS

| | | | |
|---|---|---|---|
| 2,348,948 | 5/1944 | Allen | 242/7.05 R |
| 3,636,621 | 1/1972 | Dammar | 29/596 |
| 3,927,456 | 12/1975 | Dammar | 242/7.05 B |
| 3,927,843 | 12/1975 | Dammar | 242/7.05 B |
| 4,174,815 | 11/1979 | Dammar | 242/7.05 B |

Primary Examiner—Billy S. Taylor
Attorney, Agent, or Firm—Burd, Bartz & Gutenkauf

[57] ABSTRACT

An armature winding machine has an armature winding core holder provided with a collet assembly for gripping the shaft of an armature core. The collet assembly has a plurality of releasable balls that connect the collet assembly to a support. A tool having a push rod and hooked fingers is used to release the balls and grasp the collet assembly for removal from its support. Another collet assembly can be mounted on the support with the tool. The armature winding machine has chucks with wire form or shrouds for guiding wire into selected slots in the armature core during the winding of the wire with the rotating flyers of the machine. The chucks are releasably mounted on supports so that they can be removed as a unit from the support and replaced with different sized chucks. The chuck and supports have cooperating connecting structure and locking dogs that releasably hold the chucks on the supports.

29 Claims, 13 Drawing Figures

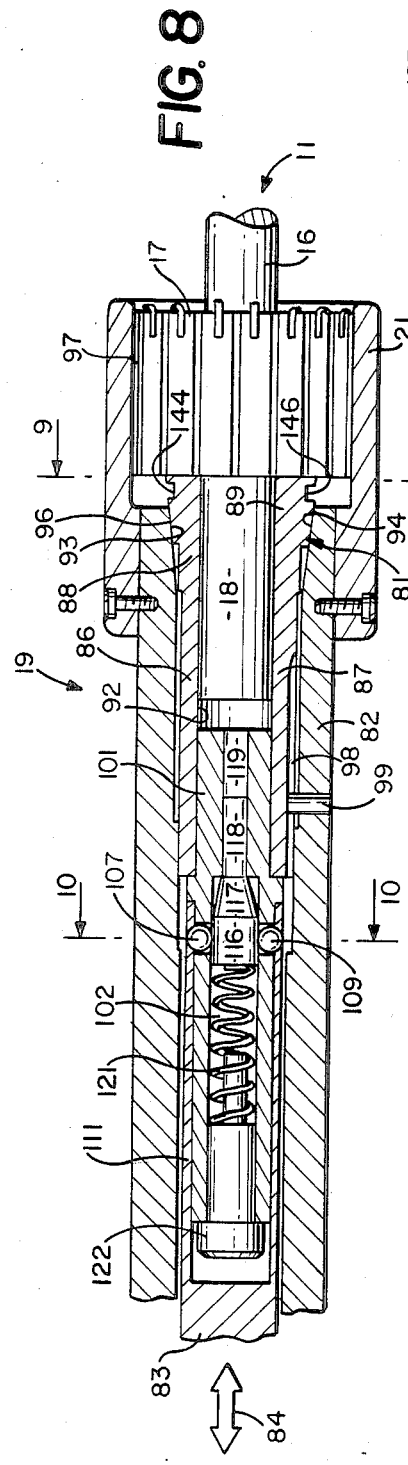
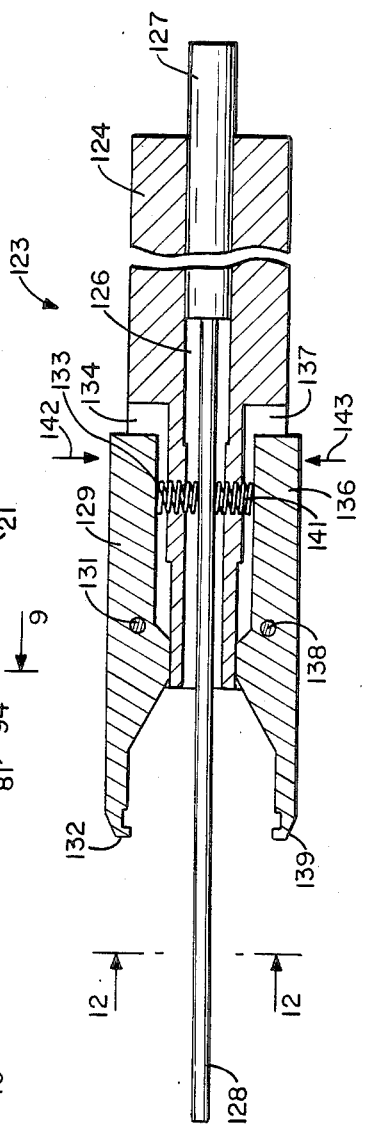
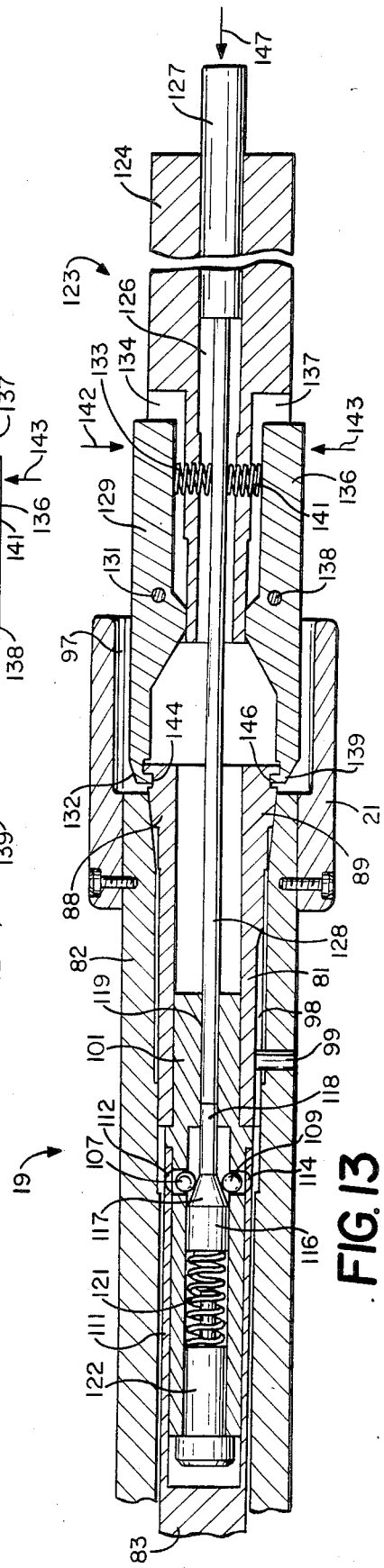

ARMATURE WINDING MACHINE WITH REMOVABLE COLLET AND SHROUDS

FIELD OF INVENTION

The invention is in the field of armature winding machines having holders for supporting armature cores and shrouds for guiding wires moving from rotating flyers into selected slots in the armature core.

BACKGROUND OF INVENTION

Armature winding machines have flyers that are rotated to wind coils of wire onto a slotted armature core. These machines have holders that locate the cores between the flyers and index the cores during the winding operation. Drive mechanisms operate to rotate the flyers in opposite directions to simultaneously place two coils of wire into selected slots in the armature cores and start and stop the rotation of the flyers to allow indexing of the cores. An example of this type of armature winding machine is disclosed by Dammar in U.S. Pat. Nos. 3,636,621 and 3,927,843. The holders have collet assemblies that grip the ends of the shafts of the armature cores during the winding operation. The collet assemblies are an integral part of the holders and are not readily removed from the machine. Each assembly has collet members that surround a pocket for accommodating the end of the armature core shaft. There is no structure to alter the size of the pocket so that only one size of shaft can be retained in the collet assembly. The entire holder must be replaced on the machine to accommodate a armature core having a different size shaft. A substantial amount of time and labor is required to remove a holder and replace it with another holder in the conventional armature winding machine.

Armature winding machines have shrouds or wire forms located adjacent the opposite sides of the armature core. The shrouds or wire forms have outer surfaces that guide the wire leaving rotating flyers into selected pairs of slots in the armature core. The central portions of the shrouds have longitudinal recesses for accommodating side portions of the armature core. The side recesses have arcuate configurations that follow the curvature of the armature core. When different sized armature cores are to be wound, different shaped shrouds must be mounted on the supports of the machine. This is a laborious and time consuming task because the shrouds are mounted on the supports in a permanent manner such that they are not readily moved from the supports. These armature winding machines cannot be quickly changed to accommodate different sized and shaped armature cores. The shrouds are mounted on supports in a manner that they are not readily removable from the supports.

SUMMARY OF INVENTION

The invention is directed to an armature winding machine of the type having means for winding coils of wire into a slotted armature core. The armature core is located with a core holding means in a position to receive coils of wire from the means for winding the wire. The core holding means includes a collet assembly operable to selectively hold the armature core and release the armature core. The collet assembly has means for releasably connecting the collet assembly to a support whereby the collet assembly can be removed as a unit from its support and replaced with another collet assembly. This enables the operator of the machine to quickly set up the machine to quickly set up the machine for different sized and types of armature cores. The machine includes shroud wire form means for guiding wire into selected slots in the armature core. The shroud means are releasably mounted on support means in a manner so that they can be readily removed as a unit and replaced with different sized and shaped shroud means. The removable collet assembly and the replaceable shroud means enable the operator of the machine to quickly set up the machine with a minimum of time and labor to accommodate different sized armature cores.

According to a preferred embodiment of the armature winding machine, a collet assembly is releasably attached to a sleeve having a plurality of recesses accommodating movable locking members, such as balls. The collet assembly has a tubular body provided with a pluraity of radial holes for the movable members. A locking member is located within the tubular body and engageable with the movable members to hold the movable members in the recesses in the sleeve. The locking member has a cylindrical portion engageable with the movable members to retain them in the recesses and a converging cone portion that allows the movable members to move out of the recesses to thereby release the collet assembly from the sleeve. The collet assembly can then be removed as a unit from the sleeve and replaced with another collet assembly. The tubular body of the collet assembly has a bore open to the pocket of the collet assembly. The locking member has a rod extended into the bore which is adapted to be engaged by a push rod operable to move the locking member to locate the cone portion adjacent the movable members to allow the movable members to move out of the recesses. The push rod is part of a tool that is used to remove the collet assembly from its support. The tool has a body of carrying a plurality of movable fingers. The fingers have hooked ends adapted to grip the collet assembly so that it can be extracted from its support.

The invention includes shroud means for guiding the wires onto selected slots of the armature cores that are releasably mounted on support means for the machines. The shroud means and support means have cooperating means that allow the shroud means to be removed as a unit from the support means. Releasable lock means associated with the cooperating means are used to retain the shroud means on the supports. When the lock means are moved to their release positions, the shroud means can be separated from the support. Another shroud means having a size and shape to accommodate these selected armature core can then be placed on the support means.

DESCRIPTION OF DRAWING

FIG. 8 is enlarged sectional view taken along the line 8—8 of FIG. 1;

FIG. 11 is a side view, partly sectional, of the tool to release and remove the collet assembly from the holder;

FIG. 13 is a sectional view of the collet assembly located within the holder and the tool releasing the collet assembly for removal of the collet assembly from the holder.

DETAIL DESCRIPTION OF INVENTION

Figure 1:
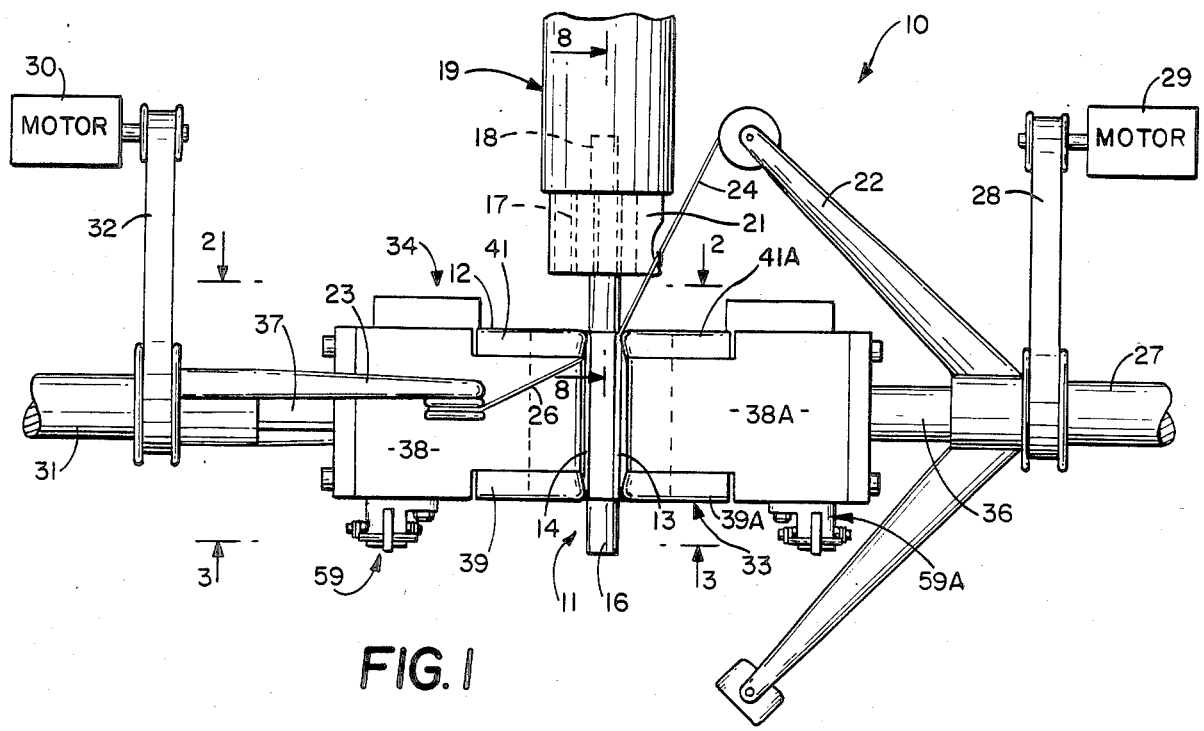
FIG. 1 is a plan view of the wire winding and armature core holding assembly of an armature winding machine.

Referring to FIG. 1 of the drawing, an armature winding assembly indicated generally at 10 of an armature winding machine is operable to wind coils of wire on a slotted armature core indicated generally at 11. Armature core 11 has a cylindrical body 12 having a plurality of circumferentially spaced longitudinal slots 13 and 14 for accommodating coils of wire. Body 12 is mounted on a longitudinal shaft 16. A commutator 17 is mounted on one end of shaft 16. Shaft 16 has an end 18 extended from commutator 17. A holder indicated generally at 19 grips shaft end 18 to hold armature core 11 in a generally horizontal position. Holder 19 is connected to indexing mechanism (not shown) used to sequentially turn or index armature core 11 during the winding operation. Holder 19 has a cylindrical shield 21 that is located over commutator 17. Shield 21 is part of a lead moving and guiding unit operable to move and guide each end wire lead that extends from the coil just wound on the armature and around a selected commutator hook while at the same time shielding the entire commutator except the selected hook. This prevents other and previously attached leads from leaving their hooks.

Wires 24 and 26 are wound into slots 13 and 14 of the body 12 with a pair of rotating flyers 22 and 23. Flyer 22 is rotatably mounted on a fixed support 27 of the armature winding machine. An endless belt 28 connects flyer 22 to a electric drive motor 29. Flyer 23 is rotatably mounted on another fixed support 31 of the armature winding machine. An endless belt 32 drivably connects flyer 23 with an electric motor 30. Flyers 22 and 23 are rotated in opposite directions during the winding operation. Other types of drive structures can be used to rotate flyers 22 and 23.

A pair of shroud assemblies 33 and 34 are located adjacent opposite sides of armature body 12. Shroud assembly 33 is mounted on a tubular support 36 to position shroud assembly 33 adjacent one side of armature body 12. Shroud assembly 34 is mounted on tubular support 37 to locate assembly 34 adjacent the opposite side of armature body 12. Supports 36 and 37 are longitudinally movable to move shroud assemblies 33 and 34 in opposite outward directions to allow armature core 11 after the wire is wound thereon to be removed from the machine and replaced with an unwound armature core.

Shroud assemblies 33 and 34 are duplicate structures mounted on supports 27 and 32 respectively. Shroud assemblies 33 and 34 are commonly known as tooling for guiding the wire in generally opposite slots of the armature core body 12 when the flyers are rotated. Shroud assemblies 33 and 34 are releasably locked onto supports 27 and 31 so that they can be readily removed as a unit and replaced with shroud assemblies to accommodate a different size and types of armature cores. The following description is directed to shroud assembly 34. The parts of shroud assembly 33 having the equivalent parts of shroud assembly 34 identified with the same reference numeral having the suffix A.

Figures 2, 4:
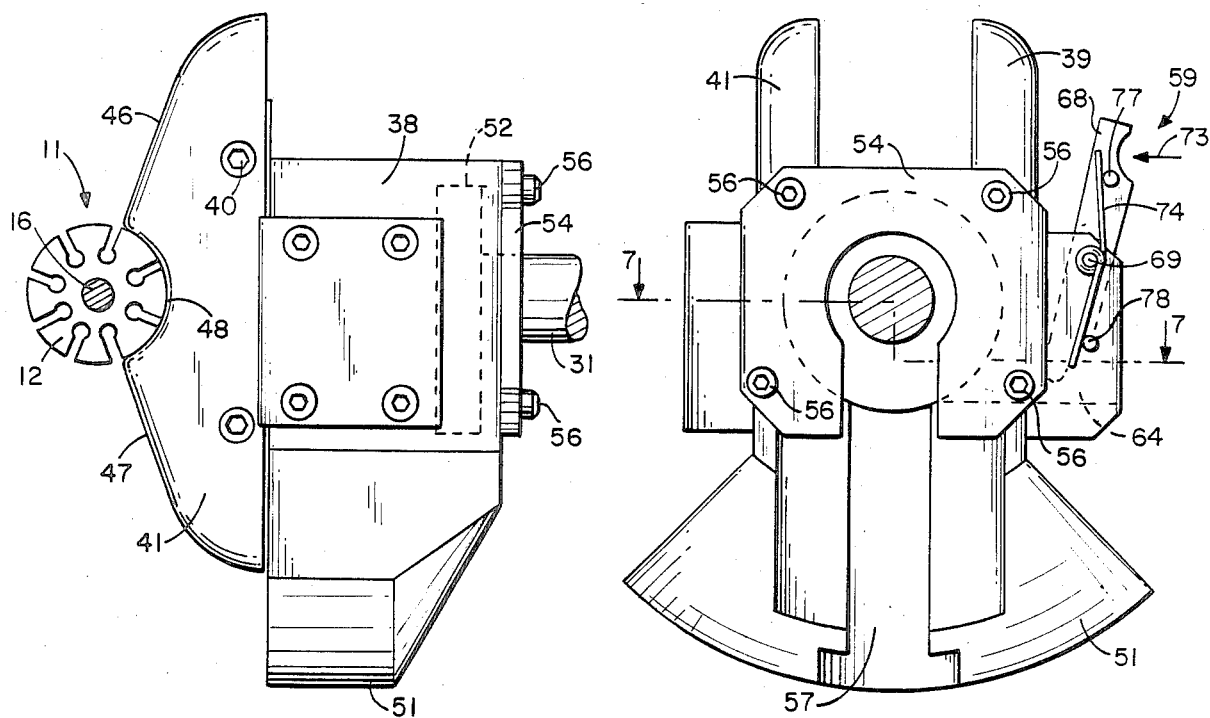
FIG. 2 is an enlarged sectional view taken along the line 2—2 of FIG. 1.
FIG. 4 is a sectional view taken along the line 4—4 of FIG. 3.
Figure 5:
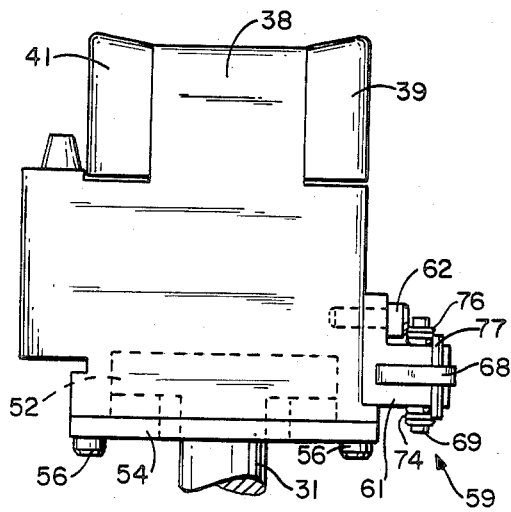
FIG. 5 is a top view of the shroud assembly of FIG. 3.
Figure 7:
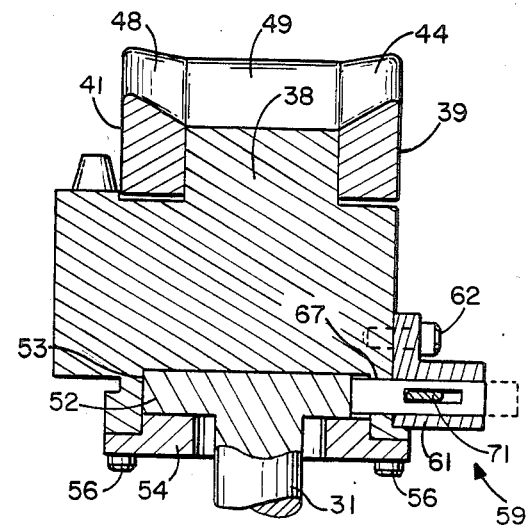
FIG. 7 is a sectional view taken along the line 7—7 of FIG. 4.

Shroud assembly 34 has a body 38 supporting a pair of generally upright guide plates 39 and 41. Guide plates 39 and 41 are secured to opposite sides of body 38 with bolts 40. Guide plate 59 has a pair of inwardly converging curved faces 42 and 43 that lead to a central concave curved recess 44. Recess 44 accommodates a circumferential portion of the side of armature core body 12. As shown in FIG. 2, guide plate 41 has inwardly converging curved faces 46 and 47 joined to a central concave curved recess 48. As shown in FIG. 7, body 38 located between side plates 39 and 41 has a concave recess 49 aligned with the recesses 44 and 48. Returning to FIGS. 2, 3, and 4, guide plate 39 and 41 extend upwardly from the top of body 38. Body 38 extends in a downward direction below the guide plates 39 and 41 terminating in an enlarged lower section 51 providing a counter balance and weight that retains the shroud assembly in its generally upright position on the end of support 31.

Referring to FIG. 7, support 31 has a head 52 at its outer end. Head 52 is an annular outwardly directed circular flange which longitudinally locates shroud assembly 34 on support 31. Body 38 has an upright groove 53 having a width substantially the same as the diameter of head 52. Groove 53 is a recess groove which is partly closed with a plate 54 attached to the end of body 38 with a plurality of bolts 56. The lower end 57 of groove 53 is open to allow shroud assembly 34 to be lifted from support 31. The upper end 58 of groove 53 has as a semi-circular curved shape that conforms to the curvature of head 52. The head 52 and body 38 with groove 53 are cooperating structures that allows shroud assembly 34 to be located in its operative position and removed as a unit from head 52. The cooperating structure can have a head on the support that is accommodated in a groove in the shroud assembly.

Figure 6:
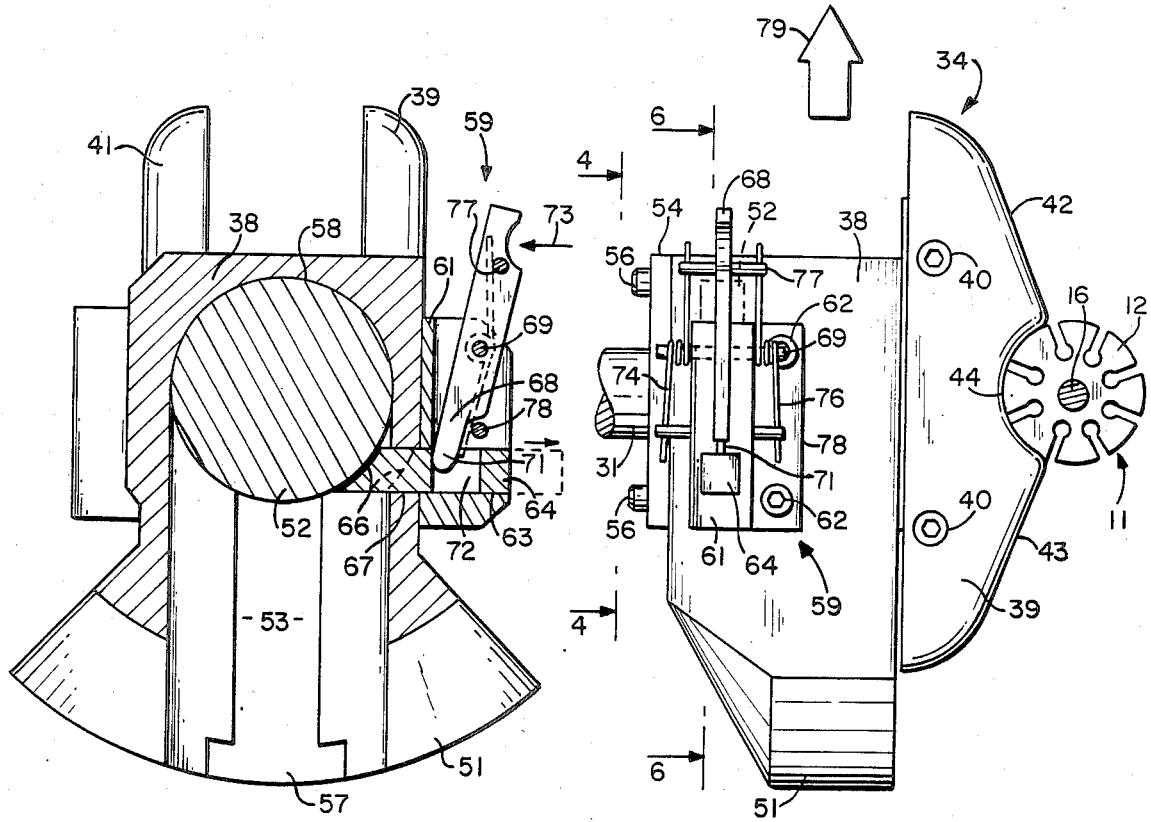
FIG. 6 is a sectional view taken along the line 6—6 of FIG. 3.
Figure 3:
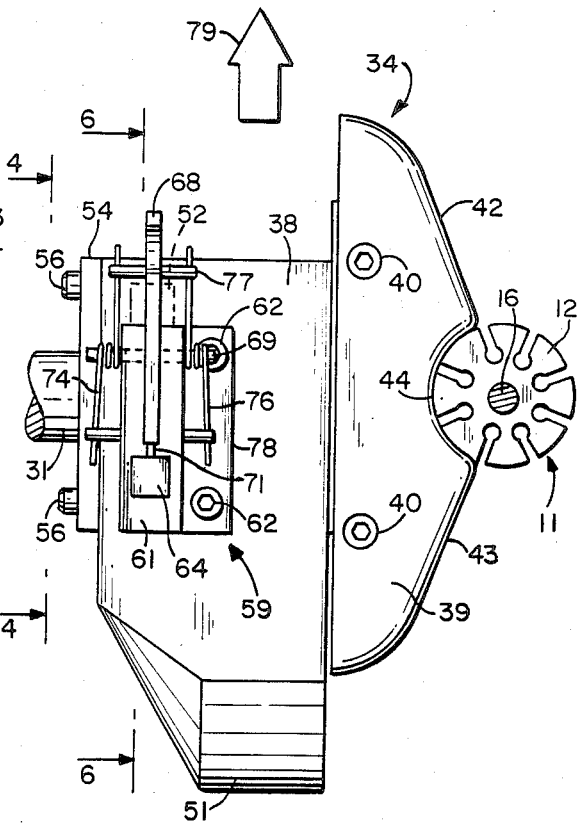
FIG. 3 is an enlarged sectional view taken along the line 3—3 of FIG. 1.
Figure 9:
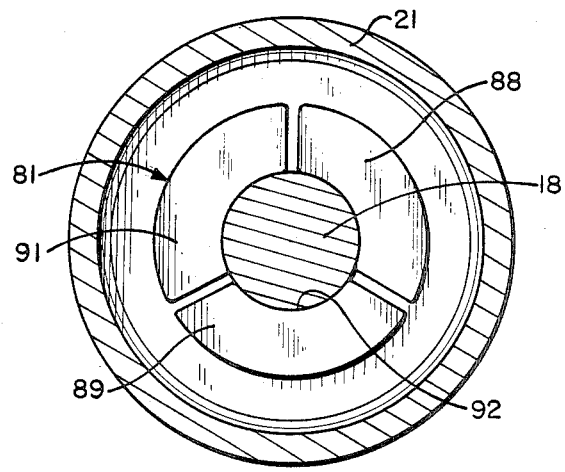
FIG. 9 is an enlarged sectional view taken along line 9—9 of FIG. 8.
Figure 10:
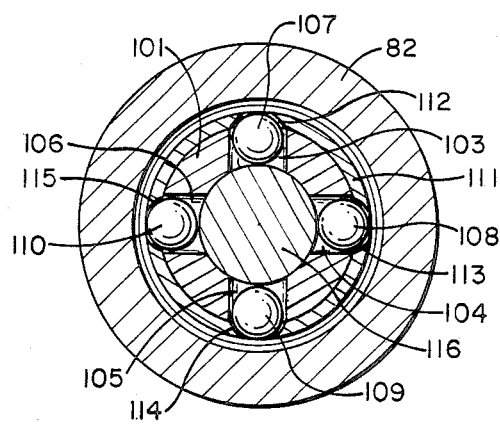
FIG. 10 is an enlarged sectional view taken along line 10—10 of FIG. 8.

A releasable lock assembly indicated generally at 59, shown in FIGS. 3, 4, 6 and 7, functions to retain shroud assembly 34 on support 31. Releasable lock assembly 59 has a body or member 61 secured to side of body 38 with a plurality of bolts 62. The lower portion of member 61 has a transverse hole or bore 63 accommodating a linear locking dog 64. The inner end 66 of dog 64 has an upwardly and outwardly taper that engages the lower portion of head 62, as shown in FIG. 6. This retains the head 52 in engagement with curved end 58 of slot 53. Dog 64 slidably positioned through a hole 67 in body 38 extends into groove 53. A lever 68 is pivotally mounted on a pivot pin 69 extended through holes in member 61. Opposite ends of pivot pin 69 extend through member 61 as shown in FIG. 3. The lower end of lever 68 has a downwardly directed finger 71 extended into a slot 72 in locking dog 64. Lever 68 when moved in the direction of arrow 73 pulls locking dog 64 to a released position as shown in broken lines in FIG. 6. Shroud assembly 34 can then be lifted as a unit from the head 52.

Locking dog 64 is biased by a pair of springs 74 and 76 to its in or lock position. Springs 74 and 76 have coiled bodies positioned about the opposite ends of pivot pin 69 as shown in FIG. 3. Springs 74 and 76 have upwardly directed legs that engage a transverse pin 77 secured to the upper end of lever 68. Springs 74 and 76 also have lower legs that extend downwardly and engage opposite ends of a fixed or anchor pin 78 secured to member 61. Springs 74 and 76 concurrently bias lever 68 in a direction to yieldably hold locking dog 64 in its in or locking position, as shown in FIG. 6, to retain shroud assembly 34 on support 34.

In use, shroud assembly 34 can be removed as a unit from the end support 31 by moving lever 68 toward body 38 to its released position. This moves locking dog 64 outwardly away from head 52. The entire shroud assembly 34 can then be lifted or raised in the direction of the arrow 79, as shown in FIG. 3, to separate it from support 31. Shroud assembly 33 can be removed in a similar manner from support 36 by moving releasable lock 59A to the release position. Shroud assemblies having shapes to accommodate different armature cores can then be mounted on supports 31 and 36. The exchange of the shroud assemblies 33 and 34 for different shaped shroud assemblies can be done in a relatively short period of time to accommodate different sizes and types of armature cores. Additional adjustments of the shroud assemblies are not required since they are complete assemblies compatible with selected sized armature cores. The shield 21 for the commutator of the core can be removed from support 82 and replaced with a shield compatible with the selected armature core. Shield 21 is axially adjustable on support 82 to permit adjustment for minor differences in commutator sizes.

Referring to FIG. 8, holder 19 has a collet assembly indicated generally at 81 for holding armature core 11. Collet assembly 81 is located within an elongated tubular support 82. The inner portion of collet assembly 81 is connected to a elongated rod 83. Rod 83 is connected to a linear actuator (not shown) operable to longitudinally move the rod 83 in opposite directions as indicated by arrow 84 to selectively open and close the collet assembly 81. Collet assembly 81 has a plurality of side members 85, 86, and 87 terminating in enlarged heads 88, 89, and 91. Preferably, three side members are located about a cylindrical pocket 92 for accommodating the end 18 of armature core shaft 16. Heads 88, 89, and 91 have tapered outer surfaces 93 and 94 that cooperate with complementary tapered surface 96 and support 82. Surface 96 has a generally cone shape. The tapered outer surfaces of heads 88, 89, and 91 slide on surface 96. When collet assembly 81 is moved into tubular support 82, heads 88, 89, and 91 move inwardly into clamping relation with the shaft end 18. When rod 83 is moved in a opposite or outward direction, heads 88, 89, and 91 move away from cone surface 96 and thereby release shaft end 18. Armature 11 can then be readily removed from collet assembly 81.

As shown in FIG. 8, when shaft end 18 is located in collet assembly 81, the entire commutator 17 is positioned within shield 21. One side of shield 21 has an opening 97 which exposes one hook of commutator 17 to accommodate a wire. Side member 87 has a longitudinal groove 98 accommodating the inner end of pin 99. Pin 99 is secured to tubular support 82. Pin 99 being located in groove 98 prevents the collet assembly 81 from rotating relative to support 82 and allows a relative linear movement of the collet assembly 81 within tubular support 82.

Collet assembly 81 has a cylindrical body 101 in engagement with collet side members 86 and 87. Body 101 has an elongated central longitudinal chamber 102 and a plurality of radial holes 103, 104, 105 and 106. Movable members, such as balls 107, 108, 109 and 110 are disposed within holes 103, 104, 105 and 106 respectively. An elongated sleeve 111 surrounding the inner end of body 101 is located over balls 107, 108, 109, and 110. Sleeve 111 has recesses 112, 113, 114, and 115 for accommodating the outer portions of balls 107, 108, 109, and 110 to lock body 101 onto sleeve 111. Balls 107, 108, 109, and 110 connect body 101 to sleeve 111 and prevent relative movement between body 101 and sleeve 111. Balls 107, 108, 109, and 110 are retained in their locking positions with a cylindrical locking member 116 slidably disposed in chamber 102. Locking member 116 has a cone shaped end 117 joined to a longitudinal rod 118. Rod 118 is slidably disposed within a longitudinal bore 119 in body 101. Bore 119 is open to the bottom of pocket 92. A coil compression spring 121 biases locking member 116 in general alignment with balls 107, 108, 109, and 110. The cylindrical portion of locking member 116 prevents balls 107, 108, 109, and 110 from moving out of recesses 112, 113, 114, and 115 in the sleeve 111. A plug 122 extended into chamber 102 holds spring 121 in assembled relation with body 101.

Figure 12:
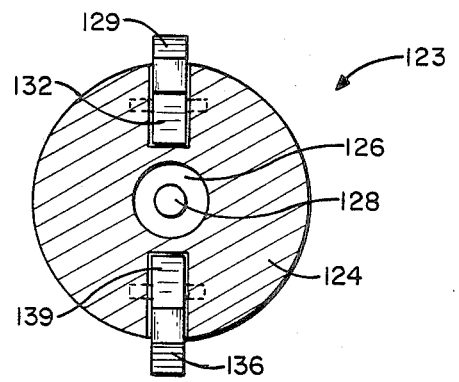
FIG. 12 is an enlarged sectional view taken along line 12—12 of FIG. 11.

Referring to FIGS. 11 and 12, there is shown the tool indicated generally at 123 used to insert and remove collet assembly 81 from tubular support 82. This enables the operator of the machine to replace collet assemblies to accommodate different sized armature cores. Tool 123 has an elongated cylindrical body 124 having a central longitudinal passage 126. A cylindrical slide 127 movably located in passage 126 extends through the outer end thereof. Slide 127 is attached to an elongated push rod 128 that extends through the opposite or forward end of body 124. A first finger 129 located within a slot 134 in the forward end of body 124 is pivoted thereon with a pivot pin 131. The forward end of first finger 129 has an inwardly directed hook 132 adapted to engage the collet head. A spring 133 located within body 124 biases finger 129 in an outward direction to hold hook 132 in clamping relation with a collet. Body 124 has a second finger 136 located diametrically opposite first finger 129. Second finger 136 located in a longitudinal slot 137 is pivoted on body 124 with a pivot pin 138. The forward end of second finger 136 has an inwardly directed hook 139 facing hook 132. A spring 141 located within body 124 biases second finger 136 to hold hook 139 in clamping relation with a collet. Hooks 132 and 139 are released from the collet by applying, squeezing or pressing force as indicated by the arrows 142 and 143 on fingers 129 and 136. Referring to FIG. 13, there is shown tool 123 in assembled relation with collet assembly 81 for removing the collet assembly from support 82. Fingers 129 and 136 extend into the space surrounded by commutator shield 21. Hooks 132 and 139 extend into grooves or slots 144 and 146 in the outer portions of collet heads 88 and 89. Springs 133 and 141 acting on fingers 129 and 136 maintain hooks 132 and 142 in slots 144 and 146. Push rod 128 extends into bore 119 and engages the end of rod 118. The operator pushes slide 127 in the direction of arrow 147 into body 124 to move locking member 116 to a release position. The coneshaped portion 117 of locking member 116 is located in alignment with the balls 107, 108, 109, and 110. This allows the balls 107, 108, 109, and 110 to move into the holes 103, 104, 105, and 106 and out of engagement with sleeve 111. Collet assembly 81 as a unit can then be withdrawn from tubular support 82 by longitudinally moving tool 123 away from the support.

A different collet assembly can be inserted into the tubular support 82 with tool 123. Fingers 129 and 136 are released from collet assembly 81 by compressing fingers 129 and 136 in the direction of arrows 142 and 143. This releases hooks 132 and 139 from slots 144 and 146. Push rod 128 is axially withdrawn from bore 119 in body 101. Fingers 129 and 136 are snapped into slots in the selected collet assembly. Slide 127 moves push rod 128 into the selected collet assembly to move locking member 116 to a position wherein balls 107, 108, 109, and 110 are in their release position. The collet assembly is then moved axially into tubular support 82. The collet assembly is circumferentially turned to align slot 98 with pin 99 so that the collet assembly can be moved to its in or locked position in support 82. Slide 127 is then released. Spring 121 moves locking member 116 to its locked position. This forces balls 107, 108, 109, and 110 in a radial outward direction and into locking position in recesses 112, 113, 114, and 115 located in sleeve 111. Spring 121 retains locking member 116 in its locked position. Fingers 129 and 136 are then released from the heads 88 and 89 of the collets by compressing fingers in the direction of arrows 142 and 143. Tool 123 is then withdrawn from the collet assembly.

An armature core is mounted on holder 19 by inserting shaft end 18 into pocket 92 surrounded by the collet members 86, 87 and 90. When rod 83 is pulled the collet members 86, 86 and 90 are forced into tight gripping engagement with shaft end 18. Commutator shield 21 can be axially moved on support 82 to adjust for minor differences in commutator shapes.

There has been shown and described an embodiment of an armature winding machine having a collet assembly and removable shrouds. Changes in the structures, arrangement of structures, materials and shapes of parts can be made by one skilled in the art without departing from the invention. The invention is defined in the following claims.

The embodiments of the invention in which an exclusive property or priviledge is claimed are defined as follows:

1. In a machine having means for winding coils of wire onto a slotted armature core having a shaft, the combination of: core holding means for locating the armature core in a position to receive coils of wire from the means for winding coils of wire onto the armature core, said core holding means having a support with a passage, a collet assembly operable to grip said shaft located within said passage, means for moving the collet assembly in said passage to selectively cause said collet assembly to selectively grip and release said shaft, said means for moving the collet assembly includes a sleeve having at least one recess, means for releasably connecting the collet assembly to the means for moving the collet assembly whereby the collet assembly can be removed from the support, said means for releasably connecting the collet assembly to the means for moving the collet assembly including at least one movable member located in said recess, and a locking member for holding the movable member in said recess, means for moving said locking member to a release position to allow said movable member to move out of the recess whereby the collet assembly can be removed from the support, shroud means for guiding wire into selected slots in the armature core, support means for holding the shroud means adjacent the armature core, and means for releasably mounting the shroud means on said support means whereby the shroud means can be removed as a unit from the support means.

2. The structure of claim 1 including: biasing means for yieldably holding the locking member in a position wherein the locking member retains the movable member in said recess thereby connecting the collet assembly to said sleeve.

3. The structure of claim 1 wherein: the sleeve has a plurality of recesses, said collet assembly having a tubular body located within said sleeve, said body having a plurality of holes and a chamber, a movable member located in each hole and extended into a recess to connect the body with the sleeve, said locking member being located within said chamber of the tubular body and engageable with said movable members to hold said movable members in said recesses.

4. The structure of claim 3 wherein: the movable members are balls.

5. The structure of claim 3 including: biasing means located within the tubular body engageable with the locking member to hold the locking member in a position wherein the locking member retains the movable members in said recesses.

6. The structure of claim 3 wherein: said locking member has a first cylindrical portion engageable with the movable members to locate the movable members in said recesses in the sleeve thereby coupling the collet assembly to the means for moving the collet assembly, and a plurality converging cone portion extended from an end of the cylindrical portion allowing the movable members to move out of said recesses in the sleeve when said cone portion is aligned with the movable members thereby releasing the collet assembly from the means for moving the collet assembly to permit the collet assembly to be removed from the support.

7. The structure of claim 6 wherein: the tubular body of the collet assembly has a bore open to the chamber therein, said locking member having a rod extended into said bore adapted to be engaged with a push rod means operable to move the locking member in said chamber to locate the cone portion of the locking member adjacent the movable members to allow the movable members to move out of said recesses thereby releasing the collet assembly from the means for moving the collet assembly.

8. In a machine having means for winding coils of wire onto a slotted armature core having a shaft, the combination of: core holding means for locating the armature core in a position to receive coils of wire from the means for winding coils of wire onto the armature core, said core holding means having a support with a passage, a collet assembly operable to grip said shaft located within said passage, means for moving the collet assembly in said passage to selectively cause said collet assembly to grip and release said shaft, said collet assembly having a body, said body having a longitudinal chamber, a plurality of radial holes open to the chamber and a bore open to one end of the chamber, a movable member located in each hole, a sleeve having a plurality of recesses aligned with the holes, a locking member having a first portion engageable with the movable members to hold the movable members in said recesses, a second portion allowing the movable members to move out of said recesses, and a third portion extended into said hole, biasing means located in said chamber engageable with said locking member to hold the locking member in a position locating the movable members in said recesses, said third portion being engageable with push rod means operable to move the locking member against the biasing means to locate the second portion of the locking member adjacent the movable members to allow the movable members to move out of the recesses thereby release the collet assembly from the means for moving the collet assembly whereby the collet assembly can be removed from the support, shroud means for guiding wire into selected slots in the armature core, support means for holding the shroud means adjacent the armature core, and means for releasably mounting the shroud means on this support means whereby the shroud means can be removed as a unit from the support means.

9. The structure of claim 8 wherein: the movable members are rigid balls.

10. The structure of claim 1 wherein: the means for releasably mounting the shroud means on the support means includes a head on the support means, said head having an outwardly directed flange means, said shroud means having a groove for accommodating the head and flange means, and releasable lock means on the shroud means engageable with the head for holding the shroud means in assembled relation with the support means, said lock means being releasable from said head whereby the shroud means can be removed from the head.

11. The structure of claim 10 wherein: said releasable lock means includes a locking dog slidably mounted on the shroud means, said dog having an end engageable with said head to hold the shroud means on the support means, lever means for moving the dog to a released position whereby the shroud means can be removed from the head.

12. The structure of claim 11 including: biasing means engageable with the lever means to hold the dog in locking engagement with said head.

13. The structure of claim 1 wherein: said means for releasably mounting the shroud means on the support means includes cooperating means on the shroud means and support means, and releasable lock means for selectively holding the cooperating means in a locked position and an unlocked position ,said lock means being movable to a released position wherein the cooperating means is in the unlocked position whereby the shroud means can be removed from the support means.

14. The structure of claim 13 wherein: said cooperating means includes a head having an outwardly directed flange means and a groove for accommodating the head and flange means, said releasable lock means being engageable with said head and flange means, said releasable lock means being engageable with said head to hold the shroud means in locking engagement with the support means and movable to an unlocked position whereby the shroud means can be removed from the support means.

15. In a machine having means for winding coils of wire onto a slotted armature core having a shaft, the combination of: core holding means for locating the core in a position to receive coils of wire from the means for winding coils of wire, said core holding means having a support with a passage, a collet assembly operable to grip said shaft located within said passage, said means for moving the collet assembly including a sleeve having at least one recess, means for moving the collet assembly in said passage to selectively cause said collet assembly to selectively grip and release said shaft, and means for releasably connecting the collet assembly to the means for moving the collet assembly, said means for releasably connecting the collet assembly to the means for moving the collet assembly including at least one movable member located in said recess, and a locking member for holding the movable member in said recess, and means for moving said locking member to a release position to allow said movable member to move out of the recess whereby the collet assembly can be removed from the support as a unit.

16. The structure of claim 15 including: biasing means for yieldably holding the locking member in a position wherein the locking member retains the movable member in said recess thereby connecting the collet assembly to said sleeve.

17. The structure of claim 15 wherein: the sleeve has a plurality of recesses, said collet assembly having a tubular body located within said sleeve, said body having a plurality of holes and a chamber, a movable member located in each hole and extended into a recess to connect the body with the sleeve, said locking member being located within said chamber of the tubular body and engageable with said movable members to hold said movable members in said recesses.

18. The structure of claim 17 wherein: the movable members are balls.

19. The structure of claim 17 including: biasing means located within the tubular body engageable with the locking member to hold the locking member in a position wherein the locking member retains the movable members in said recesses.

20. The structure of claim 17 wherein: said locking member has a first cylindrical portion engageable with the movable members to locate the movable members in said recesses in the sleeve thereby coupling the collet assembly to the means for moving the collet assembly, and a generally converging cone portion extending from an end of the cylindrical portion allowing the movable members to move out of said recesses in the sleeve when said cone portion is aligned with the movable members thereby releasing the collet assembly from the means for moving the collet assembly to permit the collet assembly to be removed from the support.

21. The structure of claim 20 wherein: the tubular body of the collet assembly has a bore open to the pocket of the collet assembly, said locking member having a rod extended into said bore adapted to be engaged with a push rod means operable to move the locking member in said chamber to locate the cone portion of the locking member adjacent the movable members to allow the movable members to move out of said recesses thereby releasing the collet assembly from the means for moving the collet assembly.

22. In a machine having means for winding coils of wire onto a slotted arumature core having a shaft, a combination of: core holding means for locating the core in a position to receive coils of wire from the means for winding coils of wire, said core holding means having a support with a passage, a collet assembly operable to grip said shaft located within said passage, said collet aseembly having a body, said body having a longitudinal chamber, a plurality of radial holes open to the chamber and a bore open to one end of the chamber, a movable member located in each hole, a sleeve having a plurality of recesses aligned with the holes, a locking member having a first portion engageable with the movable members to hold the movable members in said recesses, a second portion allowing the movable members to move out of said recesses, and a third portion extended into said bore, biasing means located in said chamber engageable with said locking member to hold the locking member in a position locating the movable members in said recesses, said third portion being engageable with a push rod means operable to move the locking member against the biasing means to locate the second portion of the locking member adjacent the movable members to allow the movable members to move out of the recesses thereby release the collet assembly from the means for moving the collet assembly whereby the collet assembly can be removed from the support as a unit.

23. The structure of claim 22 wherein: the movable members are rigid balls.

24. In a machine having means for winding coils of wire onto a slotted armature core having a shaft, comprising: core holding means for locating a core in a position to receive coils of wire from the means for winding coils of wire, said coil holding means having a support with a passage, a collet assembly operable to grip said shaft located within said passage to hold said core, means for moving the collet assembly in said passage to selectively cause said collet assembly to selectively grip and release said shaft including first means having at least one recess, means for releasably connecting the collet assembly to the first means including at least one movable member located in said recess, second means for holding the movable member in said recess, biasing means for yieldably holding the second means in a position wherein the second means retains the movable member in said recess thereby connecting the collet assembly to the first means, and third means for moving said second means to a release position to allow said movable member to move out of the recess whereby the collet assembly can be removed from the support as a unit.

25. The structure of claim 24 wherein: the first means has a chamber and plurality of recesses open to the chamber, said collet assembly having a tubular body located within said chamber of the first means, said body having a plurality of holes, a movable member located in each hole and extended into a recess to connect the body with the first means, said second means being located within said tubular body and engageable with said movable members to hold said movable members in said recesses.

26. The structure of claim 25 wherein: the movable members are rigid balls.

27. The structure of claim 25 wherein: said biasing means is located within the tubular body and engageable with the second means to hold the second means in a position wherein the second means retains the movable members in said recesses.

28. The structure of claim 25 wherein: said second means has a first cylindrical portion engageable with the movable members to locate the movable members in said recesses in the first means thereby coupling the collet assembly to the first means, and a generally converging cone portion extended from one end of the cylindrical portion allowing the movable members to move out of said recesses in the first means when said cone portion is aligned with the movable members thereby releasing the collet assembly from the first means to permit the collet assembly to be removed from the support as a member.

29. The structure of claim 25 wherein: the tubular body of the collet assembly has a bore open to the chamber therein, said second means having a rod extended into said bore adapted to be engaged with a push rod means operable to move the second means in said chamber to locate the cone portion of the second means adjacent the movable members to allow the movable members to move out of said recesses thereby releasing the collet assembly from the first means.

* * * * *